(No Model.) 2 Sheets—Sheet 1.
A. HORN.
CONFECTIONERY COOLING APPARATUS.
No. 535,830. Patented Mar. 19, 1895.
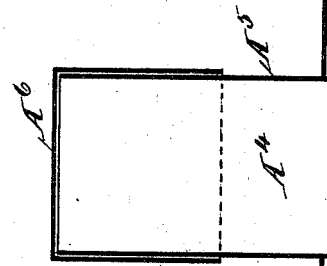
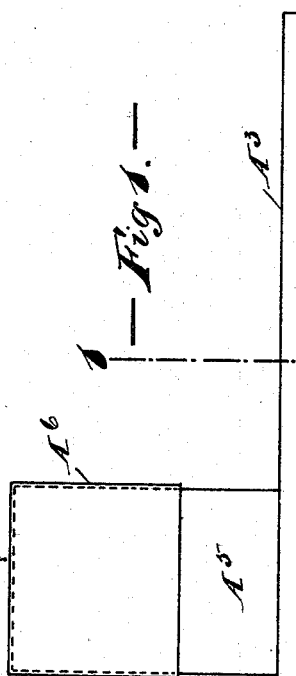

(No Model.) 2 Sheets—Sheet 2.
A. HORN.
CONFECTIONERY COOLING APPARATUS.
No. 535,830. Patented Mar. 19, 1895.
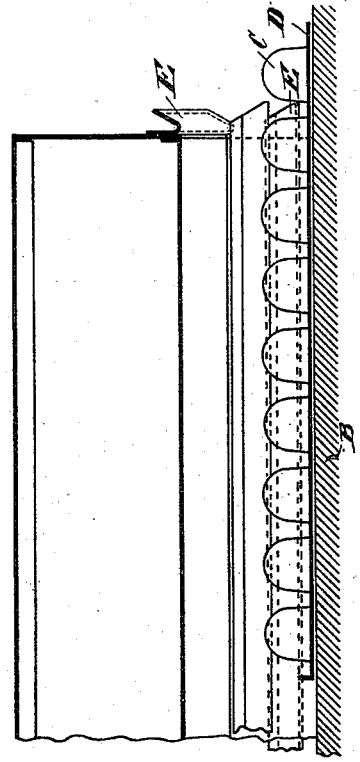
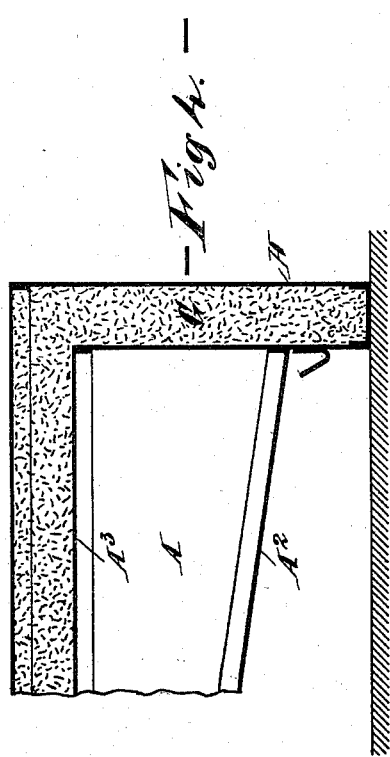
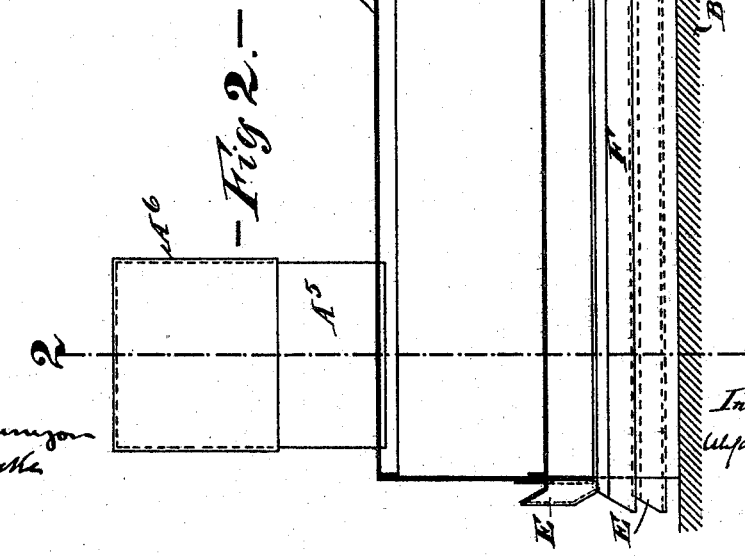

UNITED STATES PATENT OFFICE.

ALEXANDER HORN, OF LONDON, ENGLAND.

CONFECTIONERY-COOLING APPARATUS.

SPECIFICATION forming part of Letters Patent No. 535,830, dated March 19, 1895.

Application filed May 24, 1894. Serial No. 512,360. (No model.)

*To all whom it may concern:*

Be it known that I, ALEXANDER HORN, managing director of the Hackney Wick Confectionery Works, a subject of the Queen of Great Britain, residing at Hackney Wick, London, in the county of Middlesex, England, have invented a certain new or Improved Cooling Apparatus, more especially applicable to the manufacture of chocolate confectionery, of which the following is a specification.

This invention relates to cooling apparatus more especially applicable to the cooling of certain articles of chocolate confectionery while the same are being manufactured; but such apparatus is also applicable to other purposes.

In the manufacture of chocolate creams and other chocolate-covered confectionery for example, as at present practiced, it is found impracticable to carry on such manufacture in an atmosphere the temperature of which exceeds a certain degree; but by the use of my invention I am enabled to carry on the manufacture whatever may be the temperature of the surrounding atmosphere.

In the drawings hereto annexed Figure 1 is an end elevation; Fig. 2, a longitudinal vertical section taken on the line 1—1 of Figs. 1 and 3, and Fig. 3 a transverse vertical section taken on the line 2—2 of Fig. 2, of an apparatus constructed in accordance with my invention, and Fig. 4 is a half transverse section of a similar apparatus with insulating material applied to its outer surface.

Similar letters of reference relate to like parts in all the figures of the drawings.

The apparatus consists of a metallic water-tight box or chamber A of oblong or other suitable shape adapted to contain cold brine, ice, or other cooling liquid or material. The box A is supported by any suitable means a short distance above the work-table B on which the chocolate creams are prepared by the operative for example. The sides of the box may be extended down below the bottom $A^2$ for this purpose as shown at $A'$. As the creams C are covered with chocolate, they are placed on a metallic plate D which is gradually pushed, as it is covered with the creams, in under the cooling box A where the chocolate is subjected to the cooling action of the cold brine, or ice, in the box above, and is thereby cooled down before it can be spoiled by the heat of the atmosphere pervading the workroom. By the time the plate D, covered with the creams C, has been pushed to the other end of the box A they are sufficiently cooled and set to prevent any chance of injury and they may then be removed and set aside for further hardening.

When it is intended to use cold brine or other cooling liquid, the box A may be closed at the top by a fixed cover as shown at $A^3$ except as to an opening $A^4$ for introducing and removing such liquid. This opening may be surrounded by a tubular extension $A^5$ to prevent splashing-over of the liquid in the box A when carrying the same from place to place, and this extension $A^5$ may be closed at top by a cap or cover $A^6$. When ice is to be employed, it may be more convenient to provide the box with a removable cover. When the cooling liquid has become too warm, or the ice has melted, the liquid, or ice water, is removed from and fresh cold liquid, or ice, put into the box.

In order to collect any moisture that may be condensed on the outer surfaces of the box A, suitable gutters E may be provided to carry it away, and to facilitate the collection of any such moisture that may condense on the under side of the bottom of the box, and to prevent the said moisture from falling on to the creams C or other confectionery, the said under side or bottom of the box is preferably made sloping as shown at $A^2$, in Figs. 1 and 3, so that the moisture will run down to and be carried away by a gutter F placed at the lower end of each slope.

In order to prevent as much as possible unnecessary loss of cooling effect by the transmission of heat to the outer surfaces of the box A, the said surfaces may be covered with felt or other suitable bad conductor of heat as shown at G for example in Fig. 4, the said bad conductor of heat being inclosed in an outer casing H or not as may be preferred.

The box A, as also the casing H (when the latter is employed) are preferably made of thin metal such as tinned iron or copper, but they may be made of any other suitable material.

Having now particularly described and ascertained the nature of the said invention and in what manner the same is to be performed, I declare that what I claim is—

In combination, the casing having the inclined bottom sloping from the center to the sides, the side walls extending down below the said bottom and forming a passage way for the candies to be cooled, the troughs E over the openings inclining downward from the center to the sides and the troughs on the inner walls at the ends of the inclined bottom, substantially as described.

In witness whereof I have hereunto set my hand in the presence of two witnesses.

ALEXANDER HORN.

Witnesses:
　STEPHEN EDWARD GUNZON,
　THOMAS LAKE.